United States Patent [19]
Mirtain

[11] 3,863,695
[45] Feb. 4, 1975

[54] PNEUMATIC TIRES AND BREAKERS THEREFOR

[75] Inventor: Henri J. Mirtain, Compiegne, France

[73] Assignee: Uniroyal, a Societe Anonyme, Clairoix, France

[22] Filed: June 6, 1973

[21] Appl. No.: 367,468

[30] Foreign Application Priority Data
July 6, 1972  France .............................. 72.24526

[52] U.S. Cl..................... 152/361 FP, 152/361 DM
[51] Int. Cl. ............................................. B60c 9/18
[58] Field of Search... 152/361 R, 361 FP, 361 DM, 152/354

[56] References Cited
UNITED STATES PATENTS

| | | | |
|---|---|---|---|
| 3,126,042 | 3/1964 | Cegnar....................... | 152/361 DM |
| 3,473,594 | 10/1969 | Mirtain.......................... | 152/361 FP |
| 3,503,432 | 3/1970 | Maiocchi..................... | 152/361 DM |
| 3,523,472 | 8/1970 | Marzocchi et al. ............. | 152/361 R |
| 3,623,529 | 11/1971 | Fausti............................ | 152/361 FP |
| 3,692,080 | 9/1972 | Boileau........................ | 152/361 DM |
| 3,703,202 | 11/1972 | Maiocchi ........................ | 152/361 R |
| 3,757,843 | 9/1973 | Carr............................. | 152/361 FP |

FOREIGN PATENTS OR APPLICATIONS
1,144,555   3/1969   Great Britain ................ 152/361 FP

*Primary Examiner*—Drayton E. Hoffman
*Attorney, Agent, or Firm*—Philip Sands, Esq.

[57] ABSTRACT

A two-ply tread-reinforcing breaker for a radial ply tire, each of the plies being folded and divided at their respective fold regions into a pair of webs. The webs of one ply define cooperatively with the webs of the other ply and S-shaped array in cross-section. The plies each have physical characteristics which differ from the other thereby imparting to the tire asymmetrical physical characteristics relative to a median equatorial plane of the tire.

13 Claims, 11 Drawing Figures

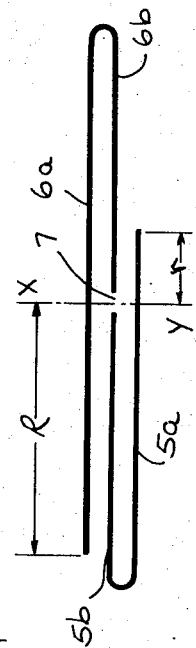
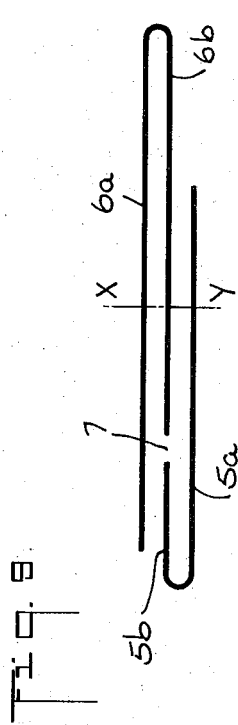
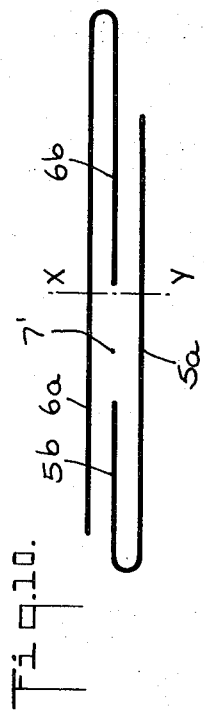
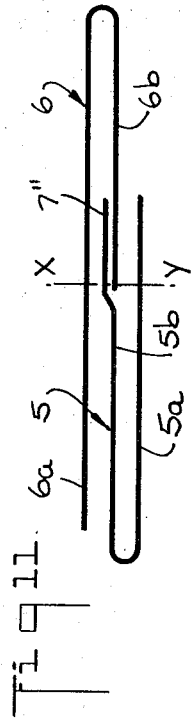
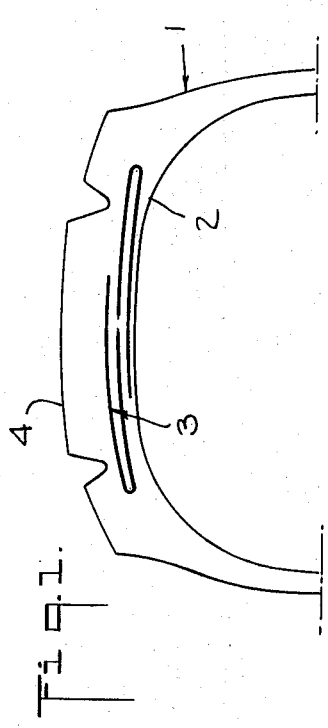
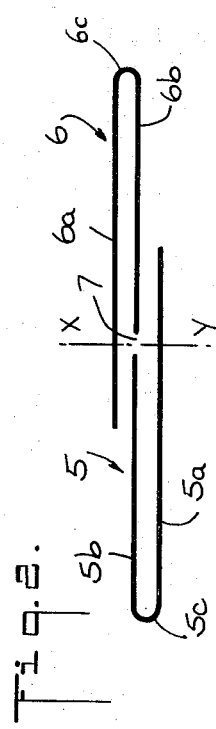
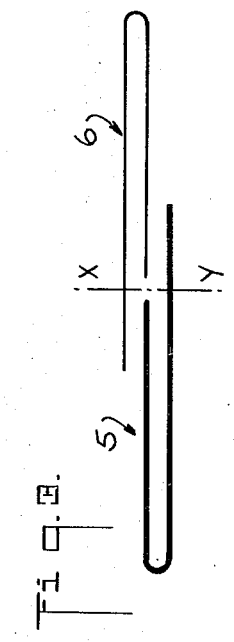
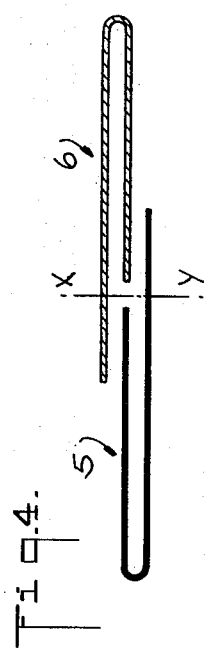

3,863,695

PNEUMATIC TIRES AND BREAKERS THEREFOR

BACKGROUND OF THE INVENTION

This invention relates to pneumatic tire for vehicles and more particularly to tread reinforcements or breakers for the type of tires generally called "radial" or "radial ply" tires.

The expressions "radial tires" and "radial ply tires" as commonly used in the pneumatic tire art may be said to include various tire constructions having a carcass or body comprising one or more reinforcement plies of weftless cord fabric extending from bead to bead wherein the cords in each ply are substantially radial in orientation, i.e. the cords are oriented substantially normal to the beads and the crown centerline of the tire. In a monoply radial tire construction, the carcass or body cords normally have a 90° bias angle, i.e. in the unshaped carcass they extend perpendicular to the planes of the beads. In a two-ply radial tire construction, the cords in each body ply are usually oriented at oppositely disposed small angles of up to 10° with respect to the perpendicular to the bead planes, in which case the respective body plies are said to have oppositely disposed bias angles of 80° or greater (but less than 90°). In four-ply or heavier radial tire constructions, similar opposed orientation of the cords in successive body plies is usually employed. All of these body or carcass constructions are contemplated within the scope and meaning of the expressions "radial" and substantially "radial" as used herein.

Radial tires are also generally provided with a tread reinforcement comprising a breaker or belt interposed between the tread and the crown region of the carcass, such breaker being comprised of one or more plies of rubberized, usually weftless, cord fabric. In such a breaker ply the cords are made of generally inextensible materials, e.g. metallic wires, glass filaments, polyester filaments, etc., and are both parallel to each other as well as oriented at a low bias angle, i.e. they are oriented substantially parallel to the bead planes and thus circumferentially of the tire. In the case of a monoply breaker structure, this bias angle may be 0°, but in the most usual case, where the breaker is a multiply structure, similar but opposed low bias angle orientations of the cords, ranging up to about 10° to the median circumferential or equatorial plane of the tire, are employed in successive plies.

For normal uses, the traditional breakers made up of a plurality of plies of rubberized metallic wires or cords, in each of which plies the cords are parallel to one another and oriented at a respective low bias angle relative to the median circumferential or equatorial plane of the tire, give excellent results.

Excellent results are also achieved by providing a pair of plies which are folded and divided at their respective fold regions each into a pair of webs. The webs of one ply define cooperatively with the webs of the other ply a substantially S-shaped array in cross-section. Because of the S-shaped configuration, there is imparted to the tire a certain degree of asymmetry relative to the median equatorial plane of the tire. However, this degree of asymmetry does not significantly affect the behavioral characteristics of the tire when "cornering" or turning sharply at high speeds.

It has been determined that under certain conditions it may be preferable to control the behavioral characteristics of the tire so that the latter can more reliably and safely stabilize istelf when traversing curves at high speeds. It has also been determined that such control over the behavioral characteristics of the tire may be effected by fabricating the tire such that it displays significant asymmetrical physical characteristics relative to its median equatorial plane.

SUMMARY OF THE INVENTION

Accordingly, it is a principal object of the present invention to provide a breaker assembly which exhibits asymmetrical physical characteristics relative to the median equatorial plane of the tire.

It is another object of the present invention to provide a breaker assembly for a pneumatic tire which effectively stabilizes the tire when "cornering" at high speeds.

To this end, the present invention relates to a reinforcing breaker interposed between a tread and carcass of a radial ply tire, the breaker comprising a pair of plies each of which is folded so as to cooperatively define with the other a substantially S-shaped array. The plies differ from one another with respect to their physical characteristics and impart to the tire physical characteristics which are asymmetrical relative to the median equatorial plane of the tire.

BRIEF DESCRIPTION OF THE DRAWINGS

The foregoing and other objects, characteristics, and advantages of the present invention will be more clearly understood from the following detailed description thereof when read in conjunction with the accompanying drawings, in which:

FIG. 1 is a fragmentary cross-sectional view of a radial ply tire and illustrates a breaker assembly pursuant to the present invention beneath the tread of the tire;

FIG. 2–4 and 8–11 are enlarged schematic views in cross-section of respective forms of the embodiments of the breaker assembly pursuant to the present invention;

DETAILED DESCRIPTION OF THE INVENTION

Figure 7:
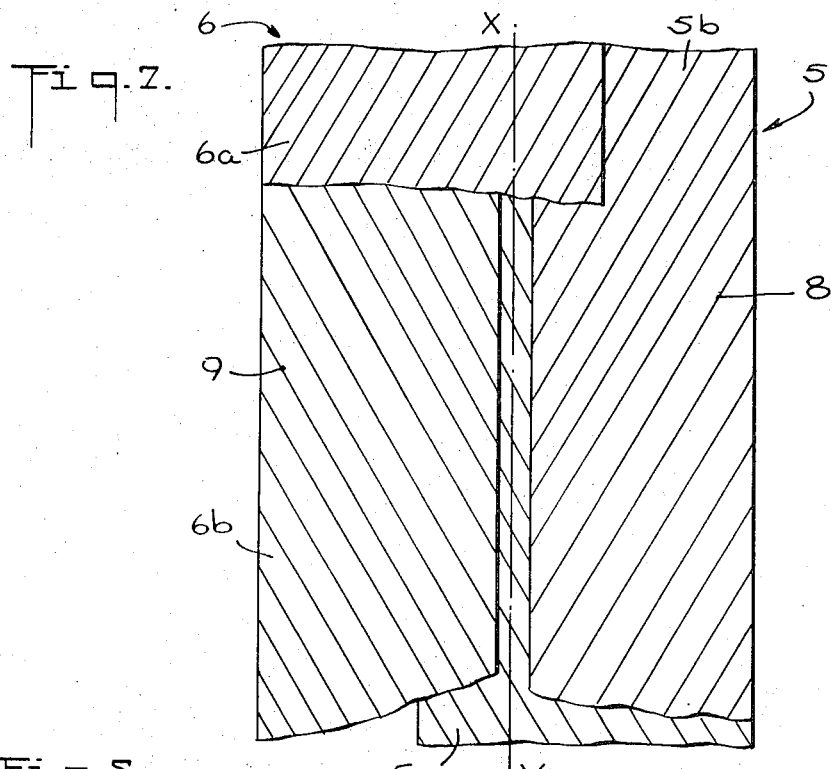
FIG. 7 is an enlarged, fragmentary, plan view of a breaker assembly pursuant to any of the embodiments of FIGS. 3, 4 and 8–11.

Referring now to the drawings, and more particularly to FIG. 1, there is illustrated a pneumatic tire, preferably of the "radial ply" type, denoted generally by the reference character 1. The tire 1 comprises a radial ply carcass having a crown region denoted by the reference character 2. Surrounding the crown region 2 is an annular reinforcing breaker assembly 3 which is generally interposed between the carcass of the tire 1 and a tread 4.

In each of the embodiments of the present invention, the breaker assembly 3 comprises a pair of plies denoted by the reference characters 5 and 6, respectively, the plies differing from one another with regard to their respective physical characteristics. A fold region 5c divides the ply 5 into a pair of webs 5a and 5b, respectively. Likewise, a fold region 6c divides the ply 6 into a pair of webs 6a and 6b, respectively. The plies 5 and 6 define and S-shaped array wherein the webs 5b and 6b lie generally in a common circumferential plane with one another. The web 5a is disposed in a circumferential plane beneath the common circumferential plane of the webs 5b and 6b, whereas the web 6a lies in a circumferential plane above the common circumferential plane of the webs 5b and 6b.

Figure 5:
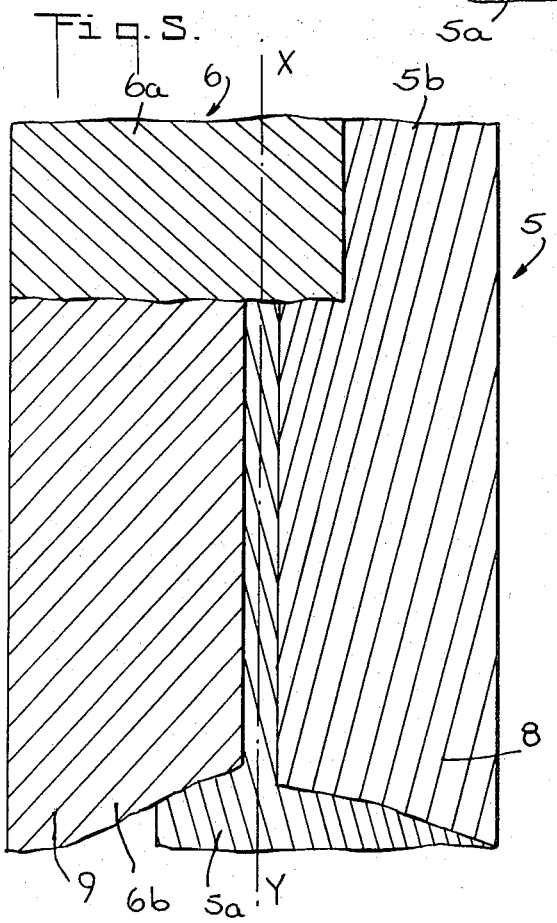
FIGS. 5 and 6 are enlarged, fragmentary, plan views of two different forms of the breaker assembly pursuant to the embodiment of FIG. 2.
Figure 6:
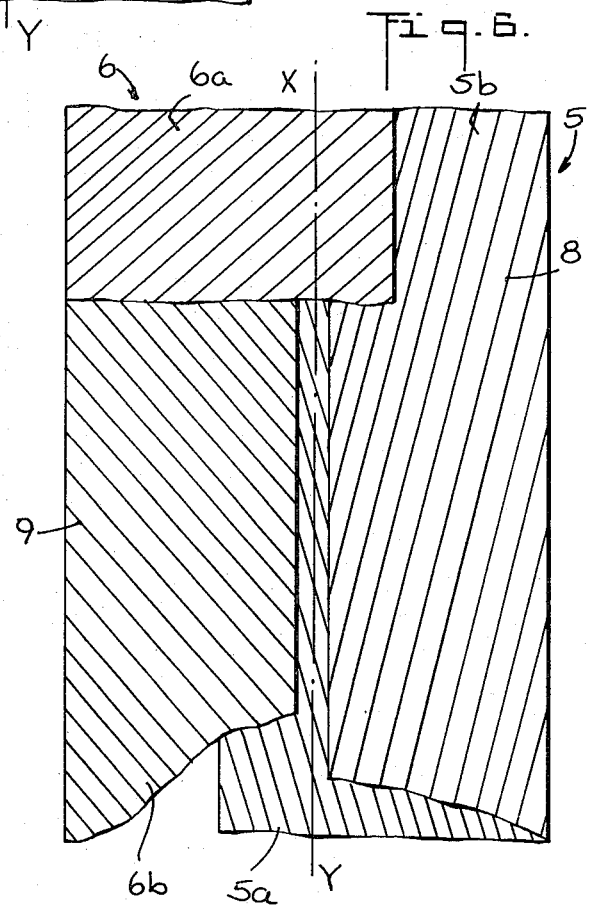

Pursuant to the embodiment illustrated in FIG. 2, and its alternate forms illustrated in FIGS. 5 and 6, the plies 5 and 6 have respective edges which are spaced closely from and confront one another in the vicinity of a median equatorial plane of the tire denoted by the line XY, the spacing or gap being denoted generally by the reference character 7. Pursuant to the embodiment of FIG. 2, one form thereof is illustrated in FIG. 5. In this form, the plies 5 and 6 have different physical characteristics with regard to the cord angles therein. In this respect, there are provided parallel cords 8 in the ply 5, and more specifically in the web 5b of the ply 5, which define an acute angle with the median equatorial plane XY of the tire 1 within a range of 12°–24°, and preferably 12°. On the other hand, there are provided parallel cords 9 in the web 6b of the ply 6, which define an acute angle with the median equatorial plane XY of the tire in a range of 12°–45°, and preferably 42°. It will be understood that since the ranges of 12°–24° and 12°–45° of the cords 8 and 9 in the webs 5b and 6b, respectively, in part overlap one another, the respective angles chosen for the cords 8 and 9 will differ from one another.

In the form of FIG. 5, the acute angle defined by the cords 8 in the web 5b, extends in a circumferential direction generally opposite the direction in which extends the angle of the cords 9 in the web 6b. In this respect, the cords 8 in the web 5b define an acute angle which diverges in the direction of YX, whereas the cords 9 in the web 6b define an acute angle which diverges in the direction XY. On the other hand, in the form of FIG. 6, the cords 8 and 9 each define acute angles which differ in degree from one another in a manner similar to that in FIG. 5, but diverge in the very same general circumferential direction YX. Thus, asymmetry is effected in the forms of FIGS. 5 and 6 of the embodiment of FIG. 2, by providing plies which have multi reenforcing cords therein which extend at acute angles relative to the median equatorial plane of the tire which differ from one another in degree, or direction and degree.

In another of the embodiments of the present invention, asymmetry may be achieved by providing plies with respective cords which have different materials. In this respect, as illustrated in FIG. 3, the ply 5 may be provided with metallic cords, for example, steel, whereas the ply 6 may be provided with non-metallic cords, for example, rayon, fiberglass, polyvinyl alcohol sold under the trademark "Vinal," or the material sold under the trademark "Fiber B" made by the E. I. Du Pont de Nemours and Company in France.

Pursuant to another form of the embodiment illustrated in FIG. 3, the plies 5 and 6 may be provided with respective cords which differ from one another in thickness. In this respect, the ply 5 may comprise cords each of which is constituted of seven strands of three filaments, each filament having a diameter of substantially 0.15 mm., whereas the ply 6 may be comprised of cords each having four strands of three filaments, again each filament having a diameter of substantially 0.15 mm.

Thus, asymmetrical physical characteristics are achieved in the from of the embodiment of FIG. 3, by providing the plies each with different types of cords, namely cords differing from one another in material and/or thickness. The plies 5 and 6 in FIG. 3 therefore differ from one another in strength and resiliency, and thereby impart to the tire asymmetrical physical characteristics relative to the median equatorial plane XY.

In the form of the embodiment illustrated in FIG. 4, asymmetry is achieved by providing the plies 5 and 6 themselves each of a different material. In this respect, the ply 5 may be constituted of an elastomeric material having a Shore hardness A between 65 and 72, and the ply 6 of an elastomeric material having a Shore hardness A between 72 and 80. It is preferred, for example, that the Shore hardness A of the ply 5 be 67, and the Shore hardness A of the ply 6 be 78. It is also possible to use identical elastomeric components for the webs 5 and 6, but in this instance each ply would be reinforced by a different type of fibrous material. For example, the ply 5 may have five parts fiberglass reinforcing material, by weight, whereas the ply 6 may have 20 parts fiberglass reinforcing material, by weight.

In another of the embodiments pursuant to the present invention, asymmetry may be acjoeved by fabricating the breaker such that the radially outermost web 6a and radially innermost web 5a extend beyond the median equatorial plane of the tire by different amounts. Moreover, asymmetry may also be achieved by disposing the gap 7 between the confronting edges of the webs 5b and 6b in their common circumferential plane at a distance remote from one side of the median equatorial plane XY of the tire.

In the first instance, as illustrated in FIG. 8, the outermost web 6a terminates at a distance R from one side of the median equatorial plane XY. On the other hand, the innermost web 5a terminates at a distance r, of at least 0.15 mm., from the other side of the median equatorial plane XY. It is clear from FIG. 8 that the combined lengths of the webs 6a and 6b of the ply 6 is substantially greater than the combined lengths of the webs 5a and 5b of the ply 5, this also assisting to impart to the breaker assembly asymmetrical physical characteristics relative to the median equatorial plane XY of the tire.

In the other instance, asymmetry is effected by providing the gap 7 at the left of and remote from the median equatorial plane XY (FIG. 9) so that the gap 7 itself by being eccentric relative to the plane XY imparts to the breaker asymmetrical physical characteristics. This represents an alternate mode of changing the overall extents of the plies 5 and 6 relative to one another.

Still another embodiment of the present invention is illustrated in FIG. 10. In this instance, the gap 7' between the confronting edges of the webs 5b and 6b in their common circumferential plane, is not only disposed eccentrically relative to the median equatorial plane XY of the tire, but it is significantly widened. In this respect, the terminal edge of the web 6b is disposed at or substantially in the vicinity of the median equatorial plane XY, whereas the terminal edge of the web 5b terminates remote from the median equatorial plane XY. Thus, the eccentric widened gap 7' imparts to the breaker assembly an asymmetrical nature relative to the median equatorial plane XY.

A further embodiment of the present invention is illustrated in FIG. 11. In this embodiment, the terminal edge of the web 6b is located in the vicinity of the median equatorial plane XY, whereas the terminal edge of the web 5b extends beyond the median equatorial plane XY and overlaps the terminal end portion of the web 6b. The overlapping portion of the web 5b is denoted generally by the reference character 7''. Moreover, to enhance the degree of asymmetry relative to the median equatorial plane XY in FIG. 11, the terminal edge of the web 6a terminates substantially beyond the median equatorial plane XY by an amount which is substantially greater than the extent at which the terminal edge of the web 5a terminates beyond the median equatorial plane XY on the opposite side of the latter.

In each of the embodiments illustrated in FIGS. 3, 4 and 8–11, it is also contemplated to provide the plies 5 and 6 with cords 8 and 9, respectively, which define an acute angle relative to the median equatorial plane XY (FIG. 7) of the same degree and in the same general circumferential direction, for example, YX. It will be understood, however, that the cord angles last referred to and illustrated in FIG. 7 need not necessarily be identical but may differ from one another in a manner described above and illustrated in FIGS. 5 and 6.

It will also be understood that the foregoing description of the preferred embodiments of the present invention is for purposes of illustration only, and that the various structural and operational features and relationships herein disclosed are susceptible to a number of modifications and changes none of which entails any departure from the spirit and scope of the present invention as defined in the hereto appended claims.

What is claimed is:

1. A pneumatic tire comprising a radial ply carcass having a crown region, a tread overlying said crown region, and a reinforcing breaker interposed between said tread and carcass, said breaker comprising a first folded ply having a fold region proximate one circumferential edge of said tread, and a second folded ply having a fold region proximate the other circumferential edge of said tread, said fold regions of said first and second plies, respectively, dividing said plies each into a pair of webs, said webs of said first ply and said webs of said second ply cooperatively defining in cross-section a substantially S-shaped array wherein one web of said first ply and one web of said second ply lie in an intermediate mutual circumferential plane and have respective non-overlapping marginal edges confronting one another in spaced relation which define an annular gap therebetween, said one web of said first ply having physical characteristics different from said one web of said second ply in said intermediate mutual circumferential plane, whereby said breaker displays asymmetrical physical characteristics relative to a median equatorial plane thereof at least in said intermediate circumferential plane, said first and second plies each including a plurality of reinforcing cords therein, the cords in said first ply having a greater diameter than the cords in second ply.

2. A tire as claimed in claim 1, wherein the cords in said first ply each define a common acute angle with said median equatorial plane, the cords in said second ply each defining a common acute angle with said median equatorial plane different from the acute angle defined by the cords in said first ply.

3. A tire as claimed in claim 2, wherein said acute angle defined by the cords in said first ply is in a range of 12°–45°, and said acute angle defined by the cords in said second ply is in a range of 12°–24°.

4. A tire as claimed in claim 2, wherein said acute angle defined by the cords in said first ply is 42°, and said acute angle defined by the cords in said second ply is 14°.

5. A tire claimed in claim 2, wherein said acute angles defined by the cords in said first and second plies, respectively, extend in the same general circumferential tire direction.

6. A tire as claimed in claim 2, wherein said acute angles defined by the cords in said first and second plies, respectively, extend in substantially opposite circumferential tire directions.

7. A tire as claimed in claim 1, wherein the cords in said first ply each comprises seven strands each having three filaments, and the cords in said second ply each comprises four strands each having three filaments.

8. A tire as claimed in claim 7, wherein each of said filaments in said first and second plies has a diameter of substantially 0.15 mm.

9. A tire as claimed in claim 1, wherein the cords in said first ply are metallic, and the cords in said second ply are non-metallic.

10. A tire as claimed in claim 1, wherein the other web of said first ply is disposed in a circumferential plane beneath said mutual circumferential plane and terminates beyond said median equatorial plane, the other web of said second ply being disposed in a circumferential plane above said common circumferential plane and terminating beyond said median equatorial plane in a direction opposite that of said first ply by a greater amount than the latter.

11. A tire as claimed in claim 10, wherein said gap between said one web of said first ply and said one web of said second ply which lie in said mutual circumferential plane is at said median equatorial plane.

12. A tire as claimed in claim 10, wherein said gap between said one web of said first ply and said one web of said second ply which lie in said mutual circumferential plane is to one side of said median equatorial plane.

13. A tire as claimed in claim 1, wherein said marginal edge of said one web of said first ply is remote from said median equatorial plane, and said marginal edge of said one web of said second ply is at said median equatorial plane.

* * * * *